April 16, 1957 G. R. STIBITZ 2,788,567
HOB FOR CUTTING ELLIPTICAL GEARS
Filed Oct. 20, 1951 5 Sheets-Sheet 1

INVENTOR.
George R. Stibitz
BY
ATTORNEYS

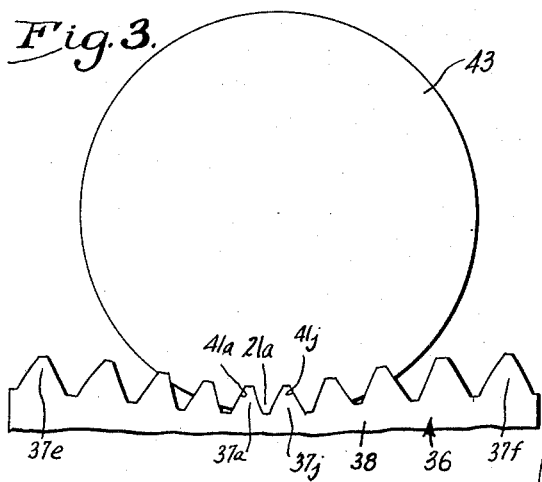
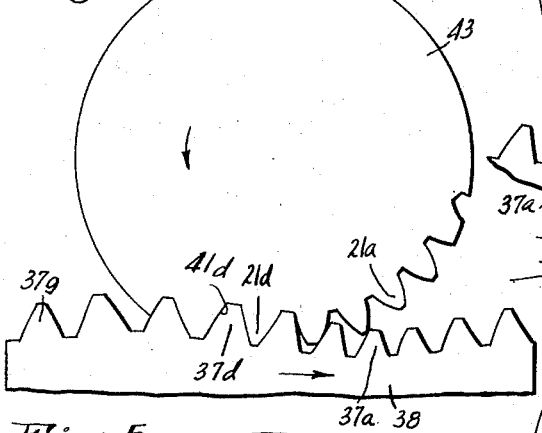
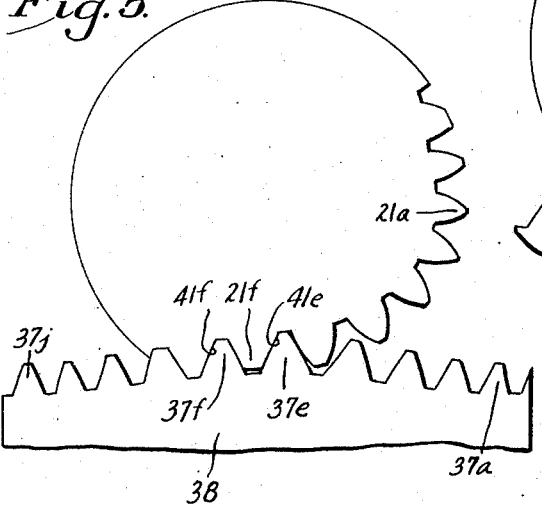
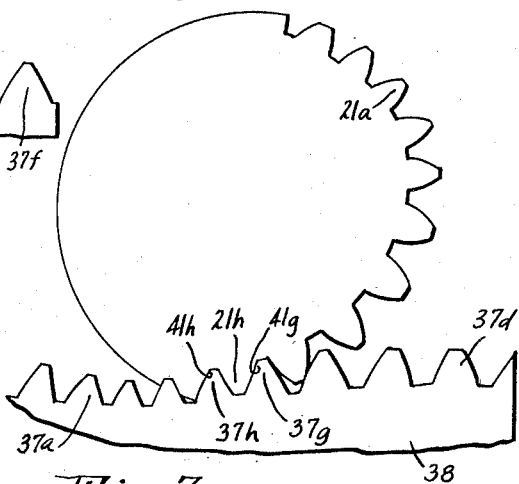
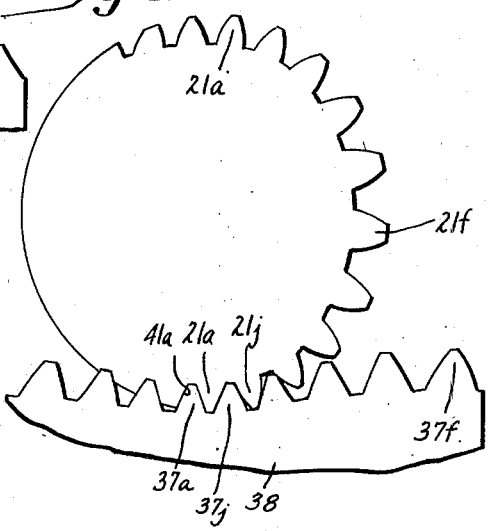

April 16, 1957  G. R. STIBITZ  2,788,567
HOB FOR CUTTING ELLIPTICAL GEARS
Filed Oct. 20, 1951  5 Sheets-Sheet 3

INVENTOR.
George R. Stibitz
BY
ATTORNEYS

April 16, 1957

G. R. STIBITZ 2,788,567

HOB FOR CUTTING ELLIPTICAL GEARS

Filed Oct. 20, 1951

INVENTOR.
George R. Stibitz
BY
Carlson, Pitzner, Hubbard + Wolfe
ATTORNEYS

INVENTOR.
George R. Stibitz
BY
ATTORNEYS

United States Patent Office 2,788,567
Patented Apr. 16, 1957

2,788,567

HOB FOR CUTTING ELLIPTICAL GEARS

George R. Stibitz, Burlington, Vt., assignor to Barber-Colman Company, Rockford, Ill., a corporation of Illinois Application October 20, 1951, Serial No. 252,374

4 Claims. (Cl. 29—103)

This invention relates to a spur toothed elliptical gear adapted for rotation about an axis coincident with a focus of an ellipse intersecting the pitch lines of the gear teeth.

One object of the invention is to provide a hob for generating the gear teeth during rotation of the gear blank about a fixed axis coincident with the center of the pitch ellipse of the gear.

The invention also resides in the novel method of utilizing the hob in forming gears from oversize blanks.

Other objects and advantages of the invention will become apparent from the following detailed description taken in connection with the accompanying drawings, in which Figure 1 is a plan view of the elliptical gear.

Figs. 3 to 7 are similar views at different points in the initial part of the hobbing cycle.

Figure 2:
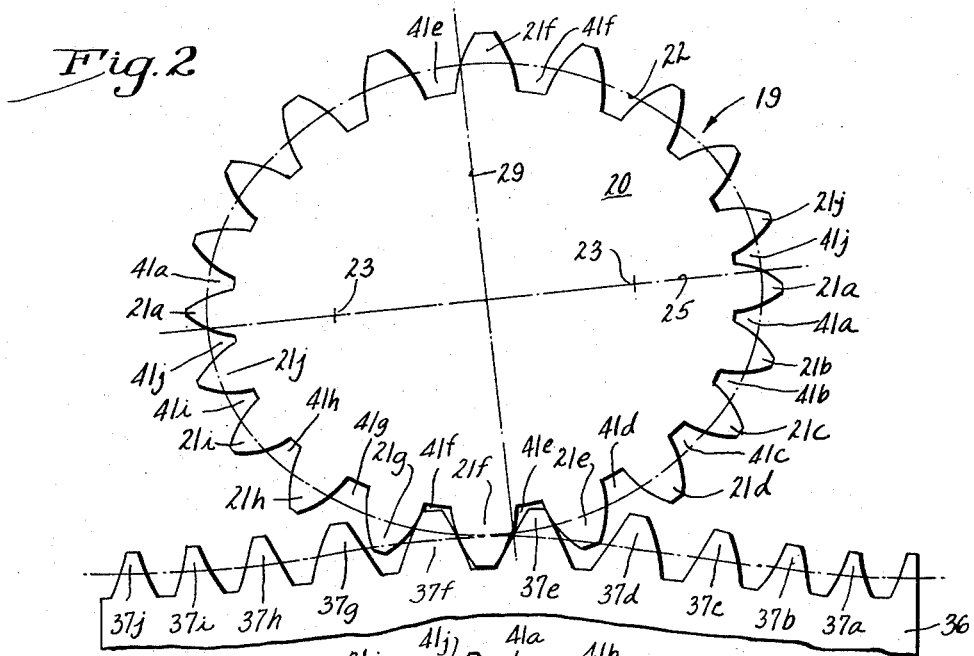
Fig. 2 is a plan view of the gear together with one row of hob teeth at the completion of the hobbing operation.
Figure 1:
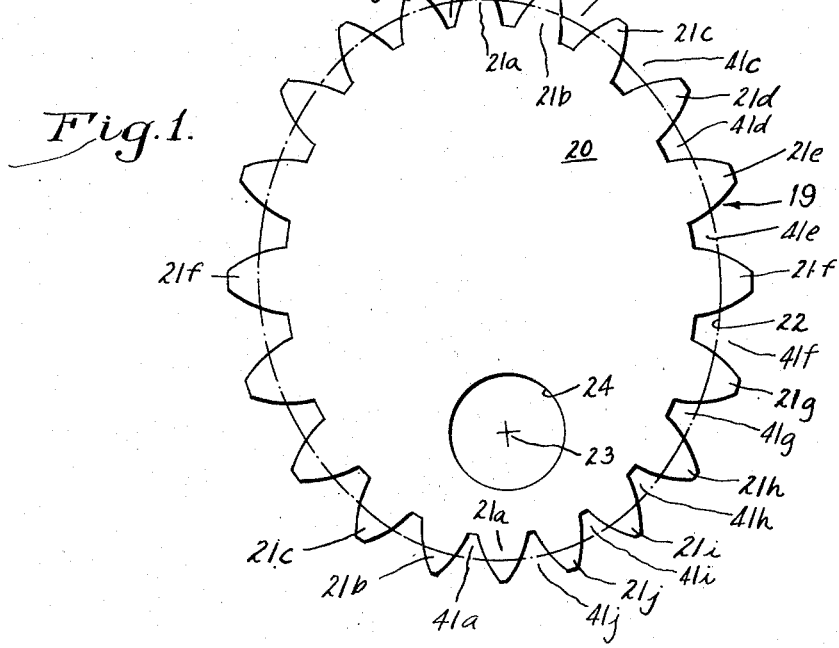

The improved elliptical gear indicated generally at 19 comprises a solid body 20 with spur teeth 21, twenty in the present instance, projecting from the periphery thereof and having pitch lines which lie on an ellipse 22 whose foci are at 23. A hole 24 adapted to receive a shaft for supporting the gear is cut in the body concentric with one focus of the ellipse. Each tooth on one side of the major axis 25 of the pitch ellipse is a duplicate of the diametrically opposite tooth on the other side of the axis.

Figures 12, 13:
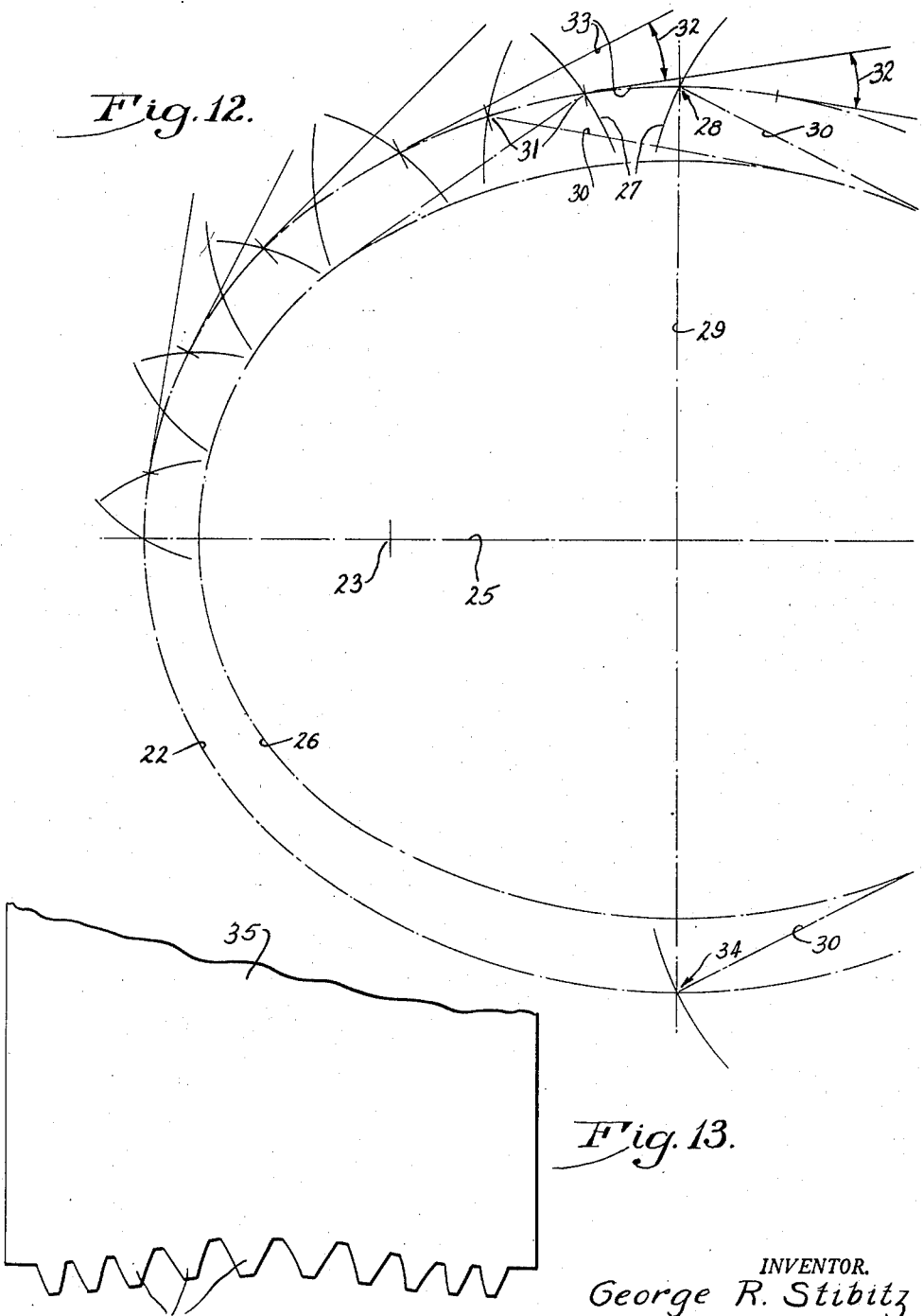
Fig. 12 is a fragmentary view illustrating the manner of laying out the gear tooth forms.
Fig. 13 is a plan view of a form tool used in cutting the hob teeth.

The side faces of the different teeth 21 and the faces on opposite sides of each tooth differ from each other in contour but, in acordance with one aspect of the invention, each is a true involute of a base ellipse 26 (Fig. 12). The latter is confocal with the pitch ellipse 22 and preferably is smaller than the latter so as to lie within the roots of the gear teeth.

To ascertain the different tooth forms from the base ellipse 26 and the concentric pitch ellipse 22, sucessive involute curves 27 are laid out across the pitch ellipse starting for example with the pitch point 28 (see Fig. 12) at the intersection of the minor axis 29 and the pitch ellipse. The involute is the path described by a point on an inextensible cord 30 as the latter is unwound from the periphery of the base ellipse 26.

One way of locating the pitch points 31 of the adjacent gear teeth is to equalize the angles 32 between the adjacent tangents 33 to the pitch ellipse through the pitch points of the adjacent gear teeth, each angle being equal to one revolution divided by the number of teeth in the gear to be produced. After the involutes for one side of the various teeth have been laid out, the process is repeated to determine the form of the opposite tooth faces starting at the point 34 of intersection of the pitch ellipse and the opposite end of the minor axis 29.

As a result of holding the tangent angles 32 constant, the gear teeth $21^f$ at opposite ends of the minor axis will be widest and the pitch width will decrease progressively toward the major axis, the teeth $21^a$ being narrowest. This is advantageous in that the number of teeth of two meshing gears that are in contact with each other is the same for all positions of the gears.

Figure 8:
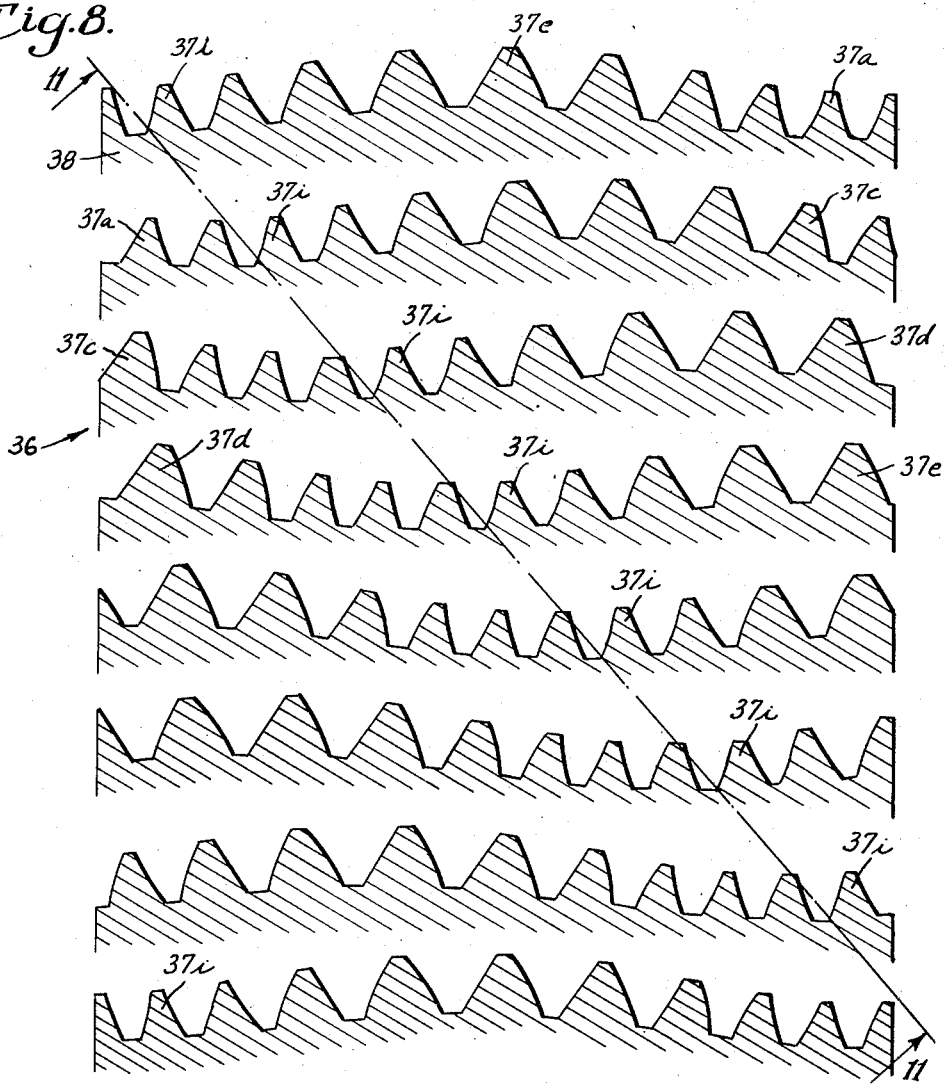
Fig. 8 shows the relation of the rows of hob teeth at spaced intervals around the full circumference of the hob.
Figure 11:
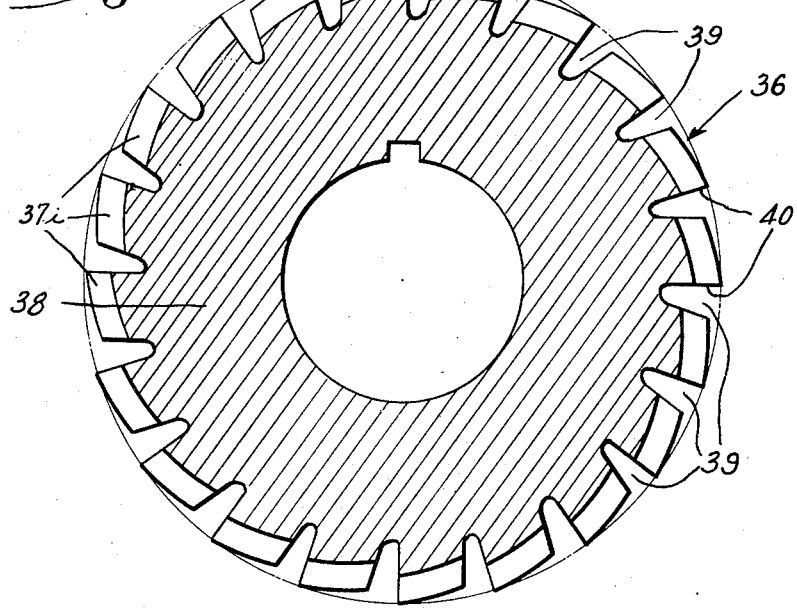
Fig. 11 is a cross-sectional view of the hob taken along the line 11—11 of Fig. 8.

The tooth form of the gear thus ascertained is used in a manner well known in the art to lay out a basic rack (not shown) and thus determine the shape of a form tool 35 (Fig. 13) used in cutting the teeth of a hob 36 which, in accordance with the present invention, is adapted for use in an ordinary hobbing machine to generate the gear teeth. It will be noted that teeth $35^a$ of the tool 35, which correspond in contour to the respective teeth on one side of the gear to be hobbed, are offset from each other different distances longitudinally of the tool body. The amounts of the offset vary progressively across the tool and correspond to the variation in radial spacing of the gear teeth 21 between the major and minor axes. Cutting of the hob teeth is performed in the usual way in a back off lathe on a hob body 38 previously formed with longitudinally extending gashes 39 paralleling the rotational axis. In the turning operation, the form tool 35 is fed across the periphery of the hob body at a rate synchronized with the speed of the body thus imparting a predetermined lead as shown in Fig. 8 to the threads or rows of teeth 37. The teeth of each helical row on the hob project equal distances from the hob axis as shown in Fig. 11, and their cutting faces 40 shown in Fig. 8 are similar in shape and correspond to the contour of the gear pockets 41 which are generated by the teeth of the row.

It will be observed from Fig. 8 that the hob teeth of different helical rows are differently spaced radially relative to the hob axis owing to the different radial positions of the different gear teeth 21 from the center of the pitch ellipse 22. Thus the teeth $37^e$ for milling the gear pockets $41^e$ along the shorter axis 29 of the ellipse project farthest from the hob axis while the teeth $37^a$ for generating the pockets $41^a$ on the major axis 25 are spaced correspondingly shorter distances from the hob axis.

The invention contemplates a novel correlation between the number of different threads or rows of teeth 37 on the hob and the number of teeth 21 on the gear to be generated so that the teeth of each row will cut two of the gear tooth spaces 41, that is, the corresponding or diametrically opposite spaces of the gear. For generating the twenty tooth gear shown, there are ten different threads or tooth rows $37^a$ to $37^j$ on the hob each adapted to mill out the metal and form two diametrically opposite spaces 41 of the gear when, in a standard hobbing operation, the gear blank is rotated one revolution for each two revolutions of the hob. As a result of this correlation, the hob for cutting a given gear may be made of minimum size.

Figure 10:
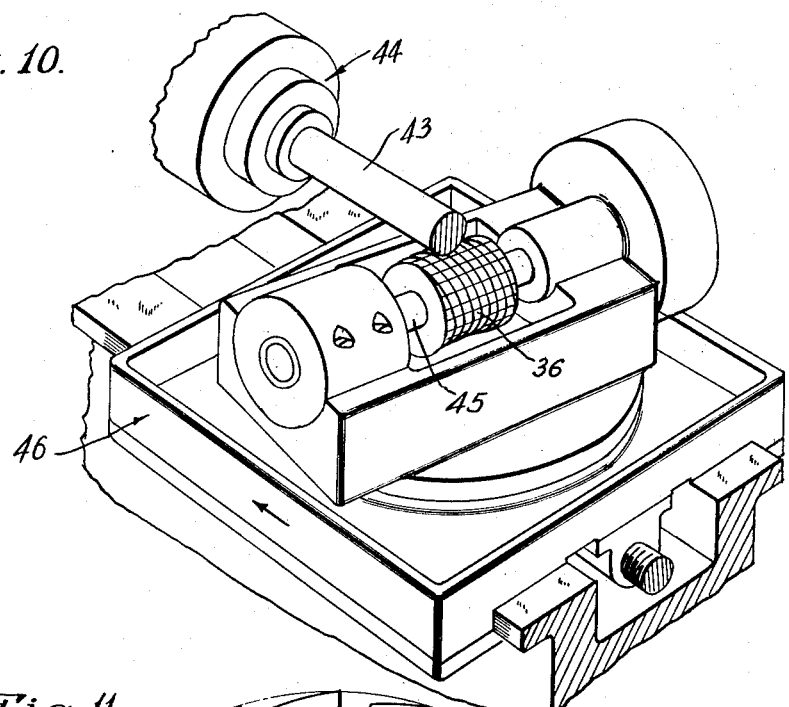
Fig. 10 is a schematic view of parts of a hobbing machine in which the improved hob may be used to cut the elliptical gear.

In the use of the hob 36 to cut the gear 19, a solid blank 43 (Figs. 3 and 10), which is larger than the major dimension of the gear 19 and may be of any cross-sectional shape, is mounted fast on the work spindle 44 of the hobbing machine which, after selection of the proper drive gearing, is arranged to rotate at a speed equal to one half of the speed of the spindle 45 carrying the hob and set at the proper angle relative to the work spindle. The hob spindle is carried by a slide 46 adapted to be fed in the direction of the arrow (Fig. 10) to move the hob into engagement with and across the periphery of the blank at the proper rate.

As the rotating hob advances into engagement with the blank, the hob teeth of the different rows cut into the blank at angularly spaced points as illustrated in Fig. 3, the starting point being immaterial. Owing to the lead of the hog threads, the position of the hob teeth, for example 37ª, cutting the gear tooth space 41ª, progresses along the hob axis as indicated by the arrow (Fig. 4) and at the same time the hob teeth of successive adjacent rows become active as shown in Figs. 4 to 7. By the time that the gear blank has turned through a half revolution, the part of the blank corresponding to the position of the other space 41ª will, as shown in Fig. 7, be positioned for engagement by the same teeth 37ª which initiated the cutting of the first space 41ª. The result is that in successive revolutions of the hob, the teeth in one helical row operate on the gear tooth spaces 41 on diametrically opposite sides of the gear blank, and the teeth of the respective rows generate the side walls of the corresponding spaces and cut the latter to the proper depth to form the gear. The latter will be completed when the hob has been fed fully across and out of engagement with the gear.

Since, as described above, variation in the radial positions of the successive gear teeth 21 is achieved by varying the radial positioning of the hob teeth 37 of different rows, the entire hobbing operation is achieved during rotation of the blank about the axis of the pitch ellipse 22 and without changing the spacing of the hob and gear blank axes. The cutting action may be initiated at any point in the revolution of the blank and the latter need not be of elliptical cross section or otherwise correlated with the shape of the final gear. Round bar stock as shown in Fig. 3 may thus be used to advantage.

Figure 9:
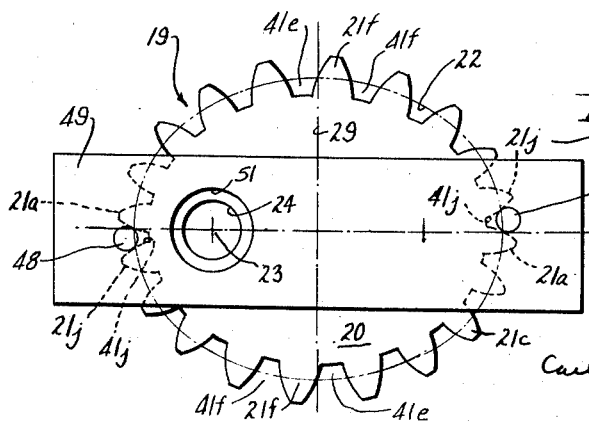
Fig. 9 is a plan view of the gear in a fixture for locating the mounting hole.

After cutting of the gear teeth, the mounting hole 24 is formed with its axis coincident with one of the foci 23 of the pitch ellipse 22. This may be accomplished by placing the gear in a suitable fixture having upstanding pins 48 adapted to mesh closely with gear tooth spaces 41 on diametrically opposite sides of the gear as shown in Fig. 9. The center of the hole 24 may be located through the use of a plate 49 (Fig. 9) having holes 50 for receiving the pins 48 and a hole 51 centered at one focus of the pitch ellipse 22 and operable to guide a tool for forming the mounting hole 24.

The elliptical gear, disclosed but not claimed herein, forms the subject matter of my copending application Serial No. 417,293, filed March 19, 1954.

I claim as my invention:

1. A hob for cutting an elliptical gear having an even number of teeth with pitch lines lying on an ellipse, said hob comprising a body, and a plurality of helical rows of outwardly projecting teeth on said body, the teeth of the successive rows being spaced from the hob axis distances corresponding to but varying inversely with the radial spacing of the respective gear tooth spaces of said gear, the lead per revolution of each of said rows of hob teeth being such that the teeth of each of said rows cut the two corresponding gear tooth spaces on diametrically opposite sides of said gear.

2. A hob for cutting an elliptical gear having an even number of teeth with pitch lines thereof lying on an ellipse, said hob comprising a body, and a plurality of helical rows of teeth projecting from said body and operable during a hobbing operation to generate the respective gear tooth spaces of said gear, the number of said rows being equal to one half the number of said gear teeth and the hob teeth of the different rows being spaced from the hob axis distances varying inversely and in proportion to the radial positions of the respective gear tooth spaces.

3. A hob operable in a conventional hobbing cycle during rotation of the hob and a gear blank in synchronism about fixed central axes to cut an elliptical gear having teeth with elliptical involute faces and pitch lines lying on an ellipse, said hob comprising a body, and a plurality of helical rows of teeth projecting outwardly from said body and respectively spaced from the hob axis different distances corresponding to but varying inversely with the radial spacing of the respective gear tooth spaces of said gear from the center of said ellipse, the teeth of said respective rows being shaped and positioned to generate said tooth spaces on said blank and simultaneously locate the pitch lines of said spaces on said ellipse.

4. A hob for generating on a gear blank an elliptical gear having teeth with pitch lines lying on an ellipse and interdental spaces whose pitch width change progressively around the ellipse from the minor to the major axis thereof and then continue to change reversely back to the minor axis, said hob comprising, a body, and a plurality of helical rows of teeth projecting outwardly from said body and respectively spaced from the hob axis different distances corresponding to but varying inversely with the radial spacing of the respective tooth spaces of said gear from the center of the ellipse, the teeth of the respective rows matching the pitch widths of said gear tooth spaces and being positioned to generate such spaces with pitch lines located on said ellipse during rotation of said blank and hob about fixed central axes in a conventional hobbing cycle.

References Cited in the file of this patent

UNITED STATES PATENTS

| | | |
|---|---|---|
| 579,708 | Fellows | Mar. 30, 1897 |
| 766,406 | Wilt | Aug. 2, 1904 |
| 801,337 | Reid | Oct. 10, 1905 |
| 844,210 | Strickland | Feb. 12, 1907 |
| 1,336,493 | Tibbetts | Apr. 13, 1920 |
| 1,404,504 | Williams | Jan. 24, 1922 |
| 1,448,803 | Huntington et al. | Mar. 20, 1923 |
| 1,560,068 | McCollum | Nov. 3, 1925 |
| 1,922,756 | Candee | Aug. 15, 1933 |
| 2,278,738 | Praeg | Apr. 7, 1942 |
| 2,381,540 | Horth | Aug. 7, 1945 |
| 2,616,336 | Holstein | Nov. 4, 1952 |